(12) United States Patent
Lee

(10) Patent No.: US 6,490,457 B1
(45) Date of Patent: Dec. 3, 2002

(54) METHOD AND APPARATUS FOR SIMULTANEOUS PAGING OF WIRELESS LOCAL LOOP SYSTEM

(75) Inventor: Won Cheon Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/492,142

(22) Filed: Jan. 27, 2000

(30) Foreign Application Priority Data

Jan. 27, 1999 (KR) ............................................. 99-2610

(51) Int. Cl.$^7$ ................................................. H04Q 7/20
(52) U.S. Cl. ........................ 455/458; 455/414; 455/416
(58) Field of Search ............................... 455/403, 410, 455/411, 413, 414, 416, 417, 422, 435, 458, 462, 463, 465, 518, 554, 555, 560, 561, 563; 379/201.01, 201.02, 202.01, 203.01, 205.01, 207.01; 370/270, 901, 908, 913

(56) References Cited

U.S. PATENT DOCUMENTS

| | | | | |
|---|---|---|---|---|
| 5,889,844 A | * | 3/1999 | Kim et al. ............. | 379/202.01 |
| 5,953,400 A | * | 9/1999 | Rosenthal et al. ..... | 379/202.01 |
| 6,112,083 A | * | 8/2000 | Sweet et al. ................. | 455/426 |
| 6,275,575 B1 | * | 8/2001 | Wu ........................ | 379/202.01 |
| 6,424,707 B1 | * | 7/2002 | Chatterjee .............. | 379/202.01 |
| 2001/0044295 A1 | * | 11/2001 | Saito et al. ................. | 455/410 |

\* cited by examiner

Primary Examiner—Nay Maung
(74) Attorney, Agent, or Firm—Fleshner & Kim, LLP

(57) ABSTRACT

The simultaneous paging method in the wireless local loop system in accordance with the present invention comprises the steps of rouging a simultaneous paging code from a transmitting terminal to a simultaneous paging processing system by a base station controller and a simultaneous paging automated response system, receiving the simultaneous paging code and verifying a service grade of the transmitting terminal and sending a ring signal to a receiving terminal based on the verification process. The present allows the simultaneous paging or the multi-user communication between subscribers of the wireless communication system so that the end-user can conveniently use the system in occasions such as a meeting between many people or the simultaneous paging between the terminals. Furthermore, since the simultaneous paging is performed only in the designated base transceiver station, the communication quality of the wireless local loop system is not affected and the overall wireless local loop system performance is enhanced.

6 Claims, 3 Drawing Sheets

METHOD AND APPARATUS FOR SIMULTANEOUS PAGING OF WIRELESS LOCAL LOOP SYSTEM

BACKGROUND OF THE INVENTION

1. Field of the Invention

This invention relates to a wireless local loop system. More particularly, the present invention relates to a method and an apparatus for a simultaneous paging in the wireless local loop system to allow a simultaneous paging between terminals connected to the wireless local loop system or communication between multiple users by utilizing the traffic channel of a designated base transceiver station.

2. Description of the Prior Art

In general, the wireless local loop system furnishes the services, such as a voice, data and a fax, to a subscriber located in a remote area where the wiring establishment is difficult by using the wireless loop. Unlike a cellular communication system or a PCS (Personal Communication Services), the characteristic of this system is that it is for immobile user services, and not mobile user services. Therefore, although the system may not have functions such as a roaming and a hand-over of the mobile communication system, it is capable of furnishing various additional services since the traffic channel and the control channel between the switchboard and the terminal are provided.

FIG. 1 illustrates the block diagram of the conventional wireless local loop system.

Referring to FIG. 1, the conventional wireless local loop system comprises a terminal 100a~100n, a base transceiver station 101a~101n which confirms the position of terminals 100a~100n and exchanges the signal, a base station controller 102 which controls the traffic channel and the control channel of the base transceiver station 101a~101n, a voice mail system 103 which processes the transmission, the accumulation and searching the digitized voice signal of terminals 100a~100n and a public switched telephone network (PSTN) 104 which communicates with the base station controller 102 and the wired subscriber 105.

FIG. 2 is a flow chart illustrating the multi-user communication method in the conventional wireless local loop system.

Referring to FIG. 2, when a transmitting terminal calls an arbitrary receiving terminal (step 201), a specified response signal is sent out by a receiving terminal and then the second receiving terminal is called (step 202). The three-user communication between the transmitting terminal and two receiving terminals is established when the response signal is transferred from the second receiving terminal (step 203).

The above described step 202 and step 203 can be repeatedly performed, and thus the multi-user communication among the affiliated terminals 100a~100n in the wireless local loop system is possible.

However, one to the disadvantages of the multi-user communication method in the conventional wireless local loop system is that, to initiate the simultaneous paging or multiple users communication, the telephone number of a desired receiving terminal must be individually dialed by operating the terminal buttons. As a result, the conventional method has an inconvenience of having to individually operate the keys of the terminal and a time-consuming problem.

Moreover, when the simultaneous paging is made to the receiving terminal moved to the scope of another base transceiver station, the communication quality of overall wireless local loop system is deteriorated due to the occupancy of a channel used of another base transceiver station by the roaming receiving terminal.

SUMMARY OF THE INVENTION

The object of the present invention is to overcome the disadvantages of the wireless local loop system of the prior art. It is the object of the present invention to provide a method and an apparatus for a simultaneous paging in order to quickly and conveniently process the multi-user communication within the terminals affiliated to the wireless local loop system by using the traffic channel of the specified station.

These and other objects are satisfied by a method for the simultaneous paging comprising the steps of: routing a simultaneous paging code from a transmitting terminal to a simultaneous paging processing system by a base station controller and a simultaneous paging automated response system; receiving the simultaneous paging code and verifying a service grade of the transmitting terminal; and delivering a ring signal to a receiving terminal based on the verification process.

Other objects of the invention are satisfied by the method for the simultaneous paging comprising the steps of: transmitting the simultaneous paging service signal from the transmitting terminal to the base station controller; transmitting an automated response message from the simultaneous paging automated response system to the transmitting terminal based on a signal of the simultaneous paging service; transmitting the simultaneous paging code from the transmitting terminal to the simultaneous paging automated response system in accordance with the automated response message; and transmitting the simultaneous paging code from the simultaneous paging automated response system to the simultaneous paging processing system based on the simultaneous paging code.

Other objects of the invention are satisfied by the method for the simultaneous paging comprising the steps of checking whether or not the received simultaneous paging code has been registered and transmitting terminal is the one which the simultaneous paging code has been assigned to.

Other objects of the invention are satisfied by the method for the simultaneous paging comprising the steps of verifying the location of the receiving terminal by the base station controller based on the simultaneous paging code; transmitting the message requesting delivery of the ring signal from the simultaneous paging processing system to the base station controller upon a permission granted via the verification process; and transferring the ring signal from the base station controller to the receiving terminal in accordance with the message requesting delivery of the ring signal.

Also, other objects of the invention are satisfied by the apparatus for the simultaneous paging of a wireless local loop system comprising multiple terminals; a base transceiver station which confirms the position of terminals and exchanges the signal; a base station controller which controls the traffic channel and the control channel of the base transceiver station; a voice mail system which processes the transmission, the accumulation and searching the digitized voice signal of terminals; a simultaneous paging automated response system, which is connected to the base station controller, detects the simultaneous paging message transferred from the transmitting terminal among the multiple terminals and sends the corresponding response message back to the transmitting terminal; a simultaneous paging processing system, which is connected with the simultaneous paging automated response system and the base station controller, allows the multi-user communication between the transmitting terminal and the receiving terminal among the multiple terminals by processing the simultaneous paging message sent by the simultaneous paging automated response system; and a public switched telephone network which connects the base station controller to the general wired subscriber.

Other features and advantages of the present invention will be readily apparent by reference to the following detailed description and accompanying drawings.

DETAILED DESCRIPTION OF THE INVENTION

Figure 1:
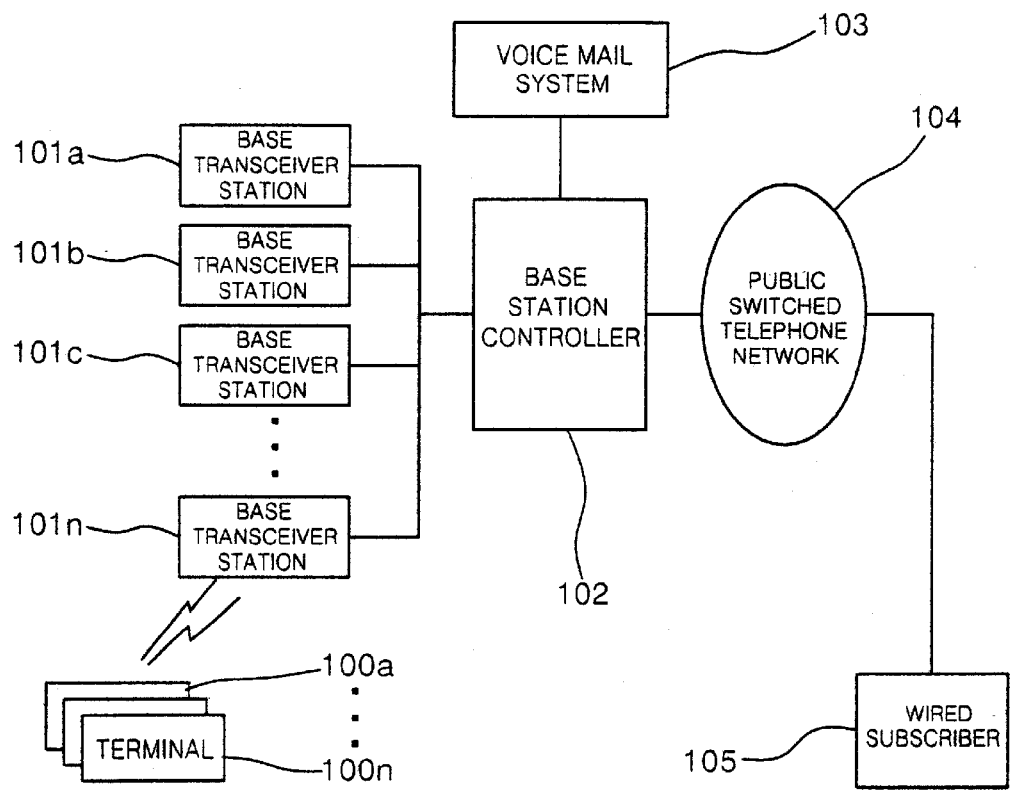
FIG. 1 is a summarized block diagram of the conventional wireless local loop system.
Figure 2:
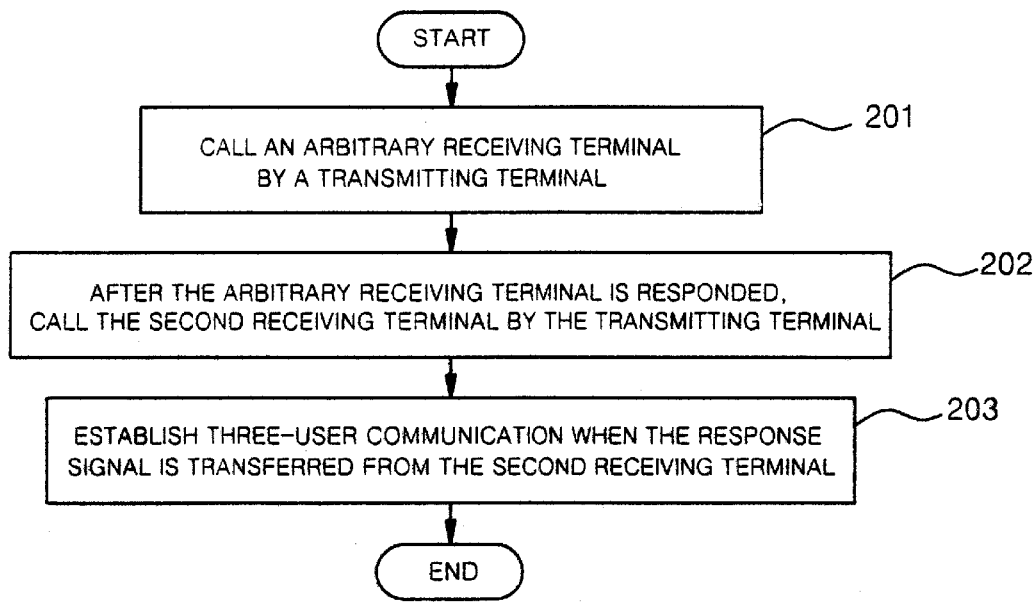
FIG. 2 is a flowchart of the multi-user communication method of the conventional wireless local loop system.
Figure 3:
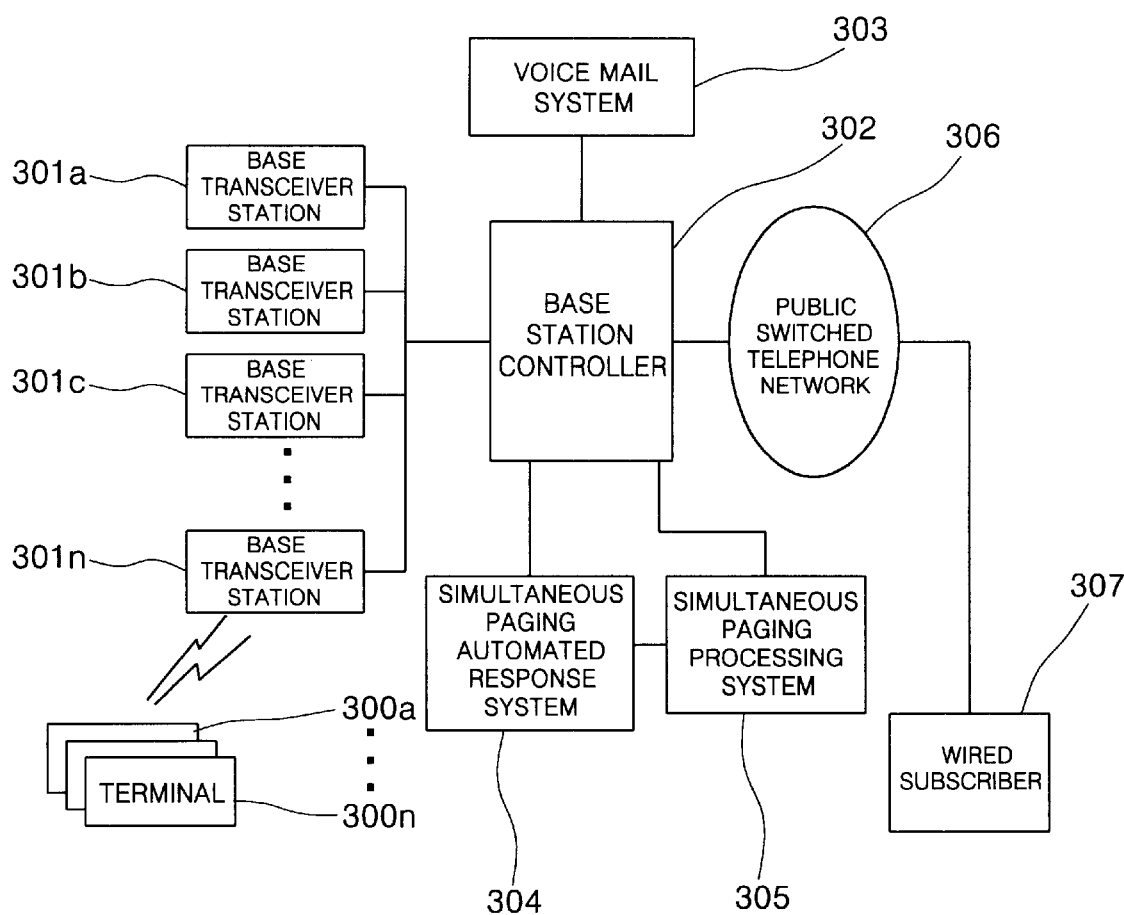
FIG. 3 is a summarized block diagram of the apparatus for the simultaneous paging of a wireless local loop system according to the present invention.

Referring to FIG. 3, the apparatus for the simultaneous paging of a wireless local loop system according to the present invention comprises: multiple terminals 300a~300n; a base transceiver station 301a~301n which exchanges the signal and confirms the position of terminals 300a~300n; a base station controller 302 which controls the traffic channel and the control channel of the base transceiver station 301a~301n; a voice mail system 303 which converts the voice signal of the terminals 300a~300n into a digitized voice signal to conduct transmission, accumulation and searching; a simultaneous paging automated response system 304, which is connected to the base station controller 302 by a voice line, detects the simultaneous paging message transferred from the transmitting terminal among the multiple terminals 300a~300n and sends the corresponding response message back to the transmitting terminal; a simultaneous paging processing system 305, which is connected with the simultaneous paging automated response system 304 and the base station controller 302 by a data line, allows the multi-user communication between the transmitting terminal and the receiving terminal among the multiple terminals 300a~300n by processing the simultaneous paging message sent by the simultaneous paging automated response system 304; and a public switched telephone network 306 which connects the base station controller 302 to the wired subscriber 307.

The operation of the above apparatus according to this invention and the processes of the simultaneous paging in the wireless local loop system in accordance with the embodiment of the present invention will be described hereinafter.

Figure 4:
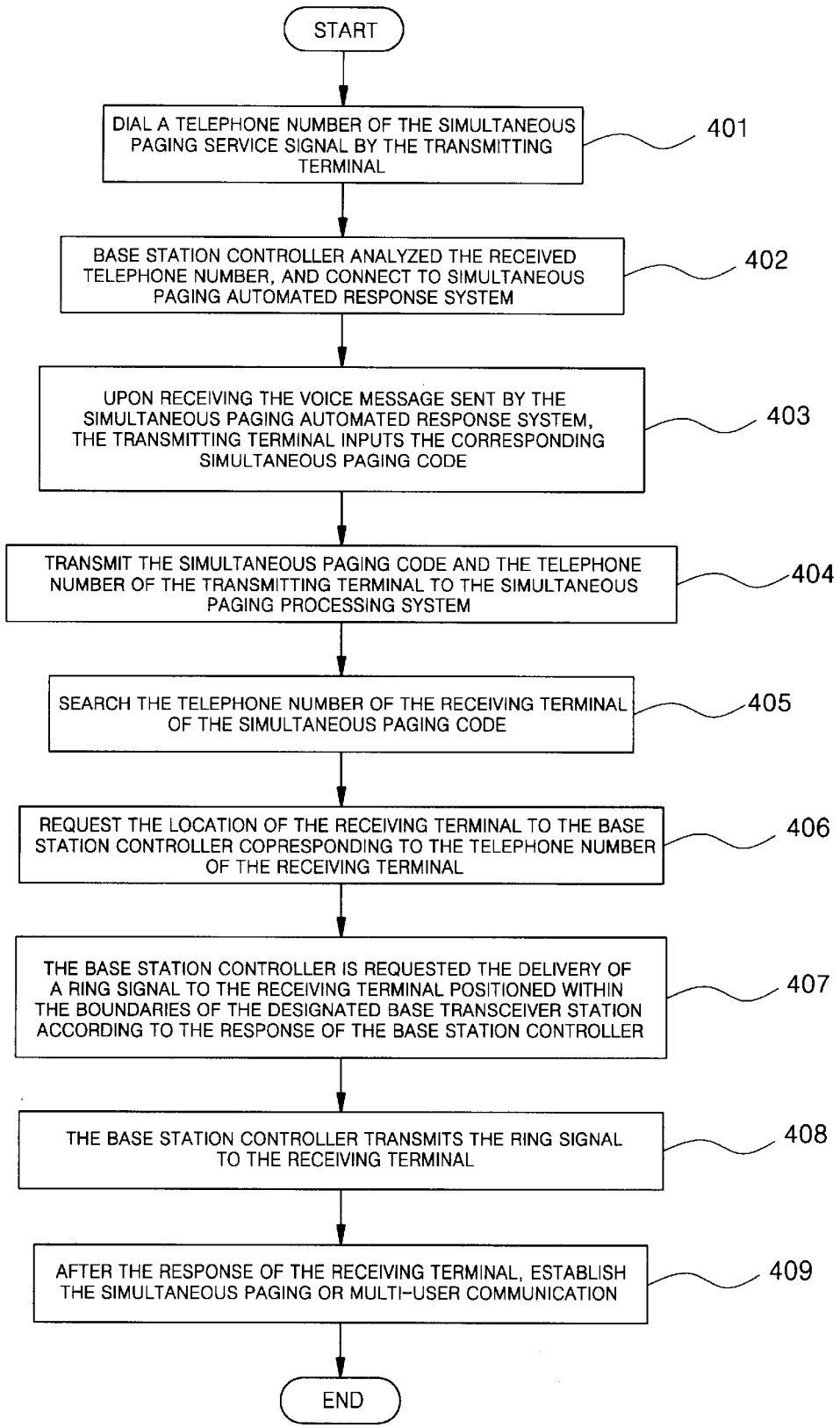
FIG. 4 is a flowchart of illustrating processing steps of the method for the simultaneous paging in a wireless local loop system in accordance with the present invention.

Referring to FIG. 4, when the telephone number corresponded to a simultaneous paging service signal is dialed by the transmitting terminal to initiate the simultaneous paging with a targeted receiving terminal (step 401), the base station controller 302 receives and analyzes the simultaneous paging service signal (telephone number), and connects to the simultaneous paging automated response system 304 (step 402). The simultaneous paging automated response system 304 sends an automated response message requesting the input of the simultaneous paging code, in a form of a voice message, to the transmitting terminal. Upon receiving the voice message sent by the simultaneous paging automated response system 304, the transmitting terminal inputs the corresponding simultaneous paging code (step 403). Thereafter, a signal tone, such as a ring back tone, is sent out to the transmitting terminal from the simultaneous paging automated response system 304 while the first receiving terminal responds to the paging. Base on the response signal sent back by the first receiving terminal the communication between the transmitting terminal and the first receiving terminal is then established.

The simultaneous paging automated response system 304 converts the simultaneous paging code received from the transmitting terminal and the telephone number of the transmitting terminal into a message format which is then transferred to the simultaneous paging processing system 305 via data line (step 404). The simultaneous paging processing system 305 checks whether or not the received simultaneous paging code has been registered and the transmitting terminal is the one that the simultaneous paging code has been assigned to. If the verification process conducted by the simultaneous paging processing system 305 determines that the received simultaneous paging code has not been registered, then the simultaneous paging automated response system 304 sends out the announcement of verification failure to the transmitting terminal, and also monitors a possible imprudent simultaneous paging of the transmitting terminal. On the other hand, if the verification process is successful and permission is granted as the inputted simultaneous paging code is determined as registered, the simultaneous paging processing system 305 searches the lists of telephone numbers to find the corresponding receiving terminal (step 405). Once the receiving terminal has been founded, a request is made to the base station controller 302 about the location of the receiving terminal, and waits for the response from the base station controller 302 (step 406). And, when the information regarding the location of the receiving terminal is received from the base station controller 302, the simultaneous paging processing system 305 sends the message to the base station controller 302 requesting delivery of a ring signal to the receiving terminal (step 407). The foregoing process is based on the assumption that the receiving terminal is positioned within the boundaries of the designated base transceiver station to receive the simultaneous paging from the transmitting terminal.

As illustrated above, the base station controller 302 delivers the ring signal to the receiving terminal located within the range of the designated base transceiver station upon receiving the requested message from the simultaneous paging process system 305 (step 408). The simultaneous paging or the multi-user communication between the transmitting terminal and the receiving terminal is then established when the receiving terminal return a proper reply of the ring signal (step 409).

Only one or two designated base transceiver stations, which the simultaneous paging or the multi-user communication can be performed, are registered to the simultaneous paging processing system 305 along with the simultaneous paging code, so that the receiving terminal which moves to another base transceiver station won't be connected even if it has the same simultaneous paging code as the transmitting terminal. Thus a traffic overload in a foreign base transceiver station, which is not designated, resulted from the channel occupancy by the receiving terminal moved in from the designated base transceiver station, is prevented. Furthermore, since the cost for a call between the transmitting terminal and the receiving terminal initiated through the simultaneous paging is generally paid by the transmitting terminal, the present invention allows a transmitting terminal user to effectively controls a calling fee since all of the receiving terminals become disconnected when the transmitting terminal is disconnected.

As illustrated in the foregoing description, the simultaneous paging method in the wireless local loop system in accordance with the present invention allows the simultaneous paging or the multi-user communication between subscribers of the wireless communication system so that the end-user can conveniently use the system in occasions such as a meeting between many people or the simultaneous paging between the terminals. Furthermore, since the simultaneous paging is performed only in the designated base transceiver station, the communication quality of the wireless local loop system is not affected and the overall wireless local loop system performance is enhanced.

What is claimed is:

1. A method for a simultaneous paging in a wireless local loop system comprises the steps of:

(a) routing a simultaneous paging code from a transmitting terminal to a simultaneous paging processing system by a base station controller and a simultaneous paging automated response system;

(b) receiving the simultaneous paging code, and verifying a service grade of the transmitting terminal; and (c) sending a ring signal to a receiving terminal based on the verification process.

2. The method of claim 1, wherein said step (a) comprises the steps of:

(a-1) transmitting the simultaneous paging service signal from the transmitting terminal to the base station controller;

(a-2) transmitting an automated response message from the simultaneous paging automated response system to the transmitting terminal based on a signal of the simultaneous paging service;

(a-3) transmitting the simultaneous paging code from the transmitting terminal to said simultaneous paging automated response system according to the automated response message; and (a-4) transmitting the simultaneous paging code from the above simultaneous paging automated response system to the simultaneous paging processing system according to said simultaneous paging code.

3. The method of claim 1, wherein said verification process for the transmitting terminal comprises the steps of checking whether or not the received simultaneous paging code has been registered and transmitting terminal is the one which the simultaneous paging code has been assigned to.

4. The method of claim 1, wherein said step (c) comprises the steps of:

(c-1) verifying the location of the receiving terminal by the base station controller based on the simultaneous paging code;

(c-2) transmitting the message requesting delivery of the ring signal from said simultaneous paging processing system to said base station controller upon a permission granted through the verification process; and (c-3) transferring the ring signal from the base station controller to the receiving terminal based on the message requesting delivery of the ring signal.

5. An apparatus for a simultaneous paging of a wireless local loop system comprises: multiple terminals;

a base transceiver station which confirms the position of terminals and exchanges the signal;

a base station controller which controls the traffic channel and the control channel of the base transceiver station;

a voice mail system which processes the transmission, the accumulation and searching the digitized voice signal of terminals;

a simultaneous paging automated response system, which is connected to the base station controller, detects the simultaneous paging message transferred from the transmitting terminal among the multiple terminals and sends the corresponding response message back to the transmitting terminal;

a simultaneous paging processing system, which is connected with the simultaneous paging automated response system and the base station controller, allows the multi-user communication between the transmitting terminal and the receiving terminal among the multiple terminals by processing the simultaneous paging message sent by the simultaneous paging automated response system; and a public switched telephone network which connects the base station controller to the general wired subscriber.

6. The apparatus of claim 5, wherein said simultaneous paging message comprises a simultaneous paging code and the telephone number of the transmitting terminal.

* * * * *